United States Patent [19]

Whitehurst, Jr.

[11] Patent Number: 4,895,306

[45] Date of Patent: Jan. 23, 1990

[54] LIQUID TRIMMER SHIELD ACCESSORY FOR HERBICIDE SPRAY HEADS

[76] Inventor: Clarence D. Whitehurst, Jr., RFD 1, Box 37-A, Stokes, N.C. 27884

[21] Appl. No.: 232,557

[22] Filed: Aug. 15, 1988

Related U.S. Application Data

[63] Continuation-in-part of Ser. No. 151,889, Feb. 17, 1988, abandoned.

[51] Int. Cl.$^4$ ................................................ B05B 1/28
[52] U.S. Cl. ..................................... 239/288; 239/519
[58] Field of Search ............... 239/546, 499, 288, 519, 239/288.3, 288.5, 265.43, 533.13, 533.14, 602

[56] References Cited

U.S. PATENT DOCUMENTS

| | | | |
|---|---|---|---|
| 1,327,452 | 1/1920 | Williams | 239/288.3 X |
| 2,593,420 | 2/1952 | Diehl | 239/546 X |
| 2,597,573 | 5/1952 | De Groff | 239/288 |
| 2,842,093 | 7/1958 | O'Neill | 239/288.2 X |
| 2,928,610 | 3/1960 | Fenimore | 239/288.5 |
| 3,498,541 | 3/1970 | Taylor | 239/546 |
| 4,199,896 | 4/1980 | Lehman | 239/288.5 X |
| 4,524,914 | 6/1985 | Jones | 239/288 X |

FOREIGN PATENT DOCUMENTS

| | | | |
|---|---|---|---|
| 36997 | 4/1968 | Finland | 239/288 |
| 1398142 | 3/1965 | France | 239/288 |
| 1566395 | 3/1969 | France | 239/288 |
| 204222 | 10/1959 | Sweden | |
| 82/03799 | 11/1982 | World Int. Prop. O. | 239/288.5 |

Primary Examiner—Andres Kashnikow
Assistant Examiner—Kevin P. Weldon
Attorney, Agent, or Firm—Laurence R. Brown; Alfred J. Mangels

[57] ABSTRACT

This invention permits a gardener to establish garden borders and to trim lawn edges simply with use of chemical herbicides thereby eliminating the need for edge trimmers or edge trimming spades. Thus, a hood accessory is provided for attachment to a hand held sprayer to conform spray from its spray head to a desired variable line width, Thus, for example, the sidewalk edge of a lawn need not be mechanically cut, but can be controlled by confining a herbicide flow pattern to a narrow line alongside the sidewalk. Similarly trimming the edges of flower or shrub gardens is feasible without the danger of killing the flowers or shrubs with herbicide. A low-price flexible walled plastic hood is thus fashioned for fitting onto the spray head. An adjustable mechanism then flexes the walls to produce a spray line width of the dimensions desired. All herbicide is thus prevented by the hood from being carried by the spray head or the wind into adjacent grass, shrubbery or flowers.

2 Claims, 2 Drawing Sheets

LIQUID TRIMMER SHIELD ACCESSORY FOR HERBICIDE SPRAY HEADS

This is a continuation-in-part of my copending application Ser. No. 07/151,889 filed Feb. 17, 1988 for Liquid Trimmer Shield Attachment now abandoned.

BACKGROUND OF THE INVENTION

1. Technical Field

This invention relates to trimming of edges of lawns and gardens with herbicides rather than mechanical cutters, and more particularly it relates to a hood accessory for a herbicide sprayer head for confining herbicide to a flow path of desired width and preventing inadvertent spraying of flowers, shrubs or lawn.

It has been known in the art that an adjustably mounted spray guard may be used in connection with a ground supported sprayer carriage moved manually or with a tractor along a given path. Examples of this are U.S. Pat. No. 4,524,912 to W. R. Jones, June 26, 1985 and French Pat. No. 1,566,395 to M. Oger Mar. 31, 1969. In these spray guards a planar plate is mounted on one side of the carriage assembly to produce one edge boundary for the spray pattern coming from a spray head mounted on the carriage as it is transported along a dispensing row.

Spray guards of fixed configuration have been used on hand transported manual sprayers as well, as shown in French Pat. No. 1,398,142 to Sucreries, et al. company Mar. 29, 1965 and in Finnish Pat. No. 36,997 to M. H. Hills on Apr. 13, 1968. These are specifically designed to direct a spray pattern o a geometrical area such as a circle in which a weed may be found alongside a desired plant to be protected from the herbicide. The shields are thus either placed around the plant to be protected or placed around the area occupied by the undesired weed. Clearly these guards are not adaptable to various spraying projects but are special purpose devices for a particular plant or shrub size and shape. Thus they find limited use.

Accordingly no prior art herbicide trimmer system has been available in the art that is economically feasible, versatile, and light weight for use with a hand sprayer without fatigue and able to chemically trim along a sharply defined line adjacent to a flower bed, shrubs or a sidewalk.

Furthermore, most of the prior art devices for limiting the spray patterns coming from a spray head cannot prevent wind blown herbicide from reaching and killing desirable plants.

Accordingly, it is an objective of this invention to provide an improved chemical trimming system for edge trimming along precisely defined lines of variable widths without the danger of killing desired plants when applied in the presence of wind.

Other objects, features and advantages of the invention will be found throughout the following description, drawings and claims.

DISCLOSURE OF THE INVENTION

A hood accessory for a hand held sprayer for dispensing herbicides is formed of a hood body member having thin flexible plastic walls defining a closed end and an open end aperture for dispensing herbicides in a pattern related to the shape of the opening. The hood assembly included a mounting clamp or bracket for holding it onto a sprayer spray head and directing the sprayed materials out of the opening in said pattern.

The spray head is positioned to direct herbicides against the hood sidewalls, from which they may run downwardly for dispensing out the shaped opening. To change the dispensing pattern, such as to choose a dispensing line of variable width, the sidewalls are flexed into a set of selectable positions and retained in place for trimming.

The hood may be substantially rectangular in cross section shape with thin plastic sidewalls, substantially of the same material and thickness as used in commercial Sallon sized containers for chemicals and antifreeze. These walls then may be shaped and held in place by a series of snap connectors on the walls near the open end. Alternatively a flexible cord may be knotted at on end and passed through apertures in opposite side walls with a clamp on the cord outside the opening flexing the walls inwardly against a residual rectangular status to narrow the opening, as desired. The hood shields the spray head from the wind, and the spray is modified at least in part to run down the walls of the hood and drip onto the round. However, the sprayer preferably positions the hood off the ground as it is moved a desired spray path manually selected, either straight or curved. Thus, an inexpensive and versatile accessory for a sprayer permits it to be used as a chemical herbicide trimmer along either curved or straight edges of a lawn, for example, without the danger of killing desired plant life.

BRIEF DESCRIPTION OF THE DRAWING

In the accompanying drawing, in which like reference characters refer to similar features throughout the various views.

THE PREFERRED EMBODIMENTS

Figure 1:
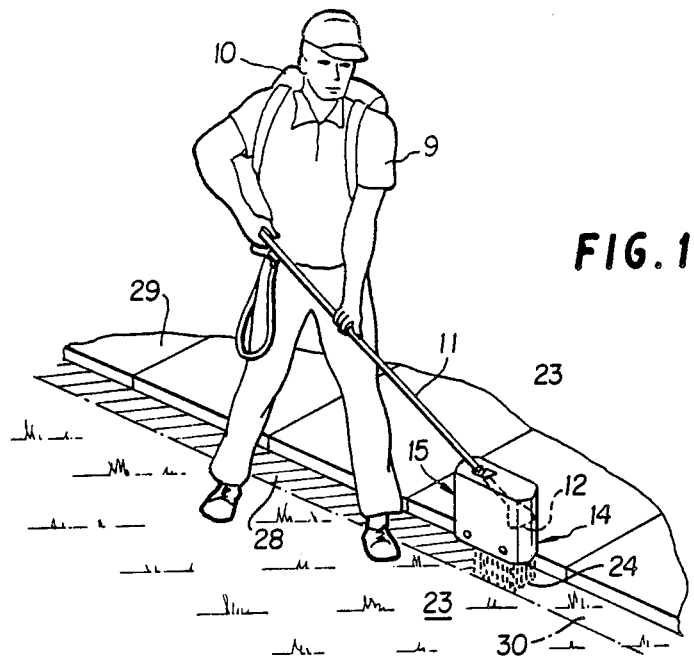
FIG. 1 is a sketch of the trimmer afforded by this invention in use for trimming with dispensed herbicides the straight edge of a lawn along a strip of desired width adjacent a sidewalk.

As may be seen from FIG. 1, a manually held sprayer 10 may be held or strapped on a person's back as shown. Thus hand held dispensing wand 11 is manually manipulated to dispense spray from a spray head 12. This invention provides for an accessory hood 15 that serves to confine the dispensing pattern, particularly for dispensed herbicides, over a limited dispensing pattern, and to prevent or significantly reduce any inadvertent herbicide presence on unwanted plant life when the wind is blowing.

Figure 2:
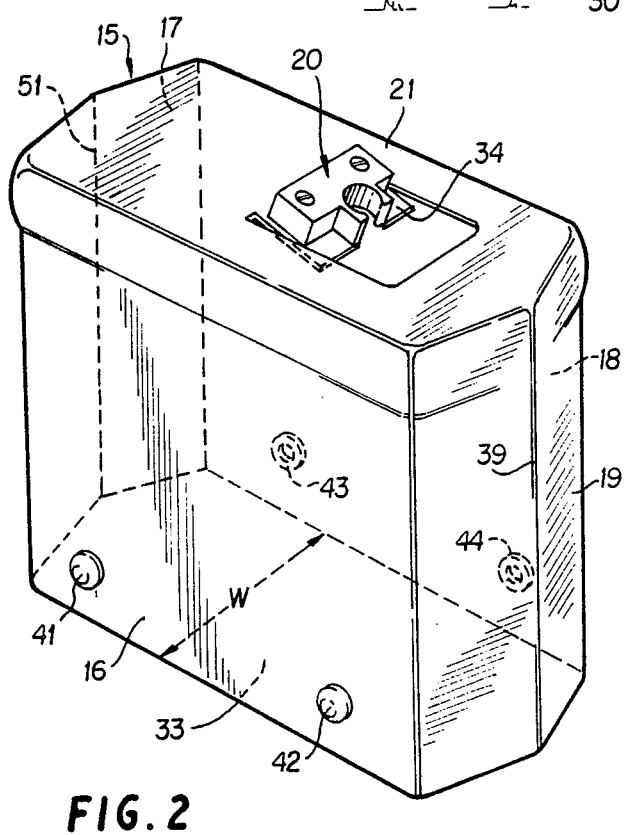
FIG. 2 is a perspective sketch of the hood accessory for a hand sprayer constructed in accordance with the teachings of this invention for adjustably producing variable dispensing patterns.
Figure 3:
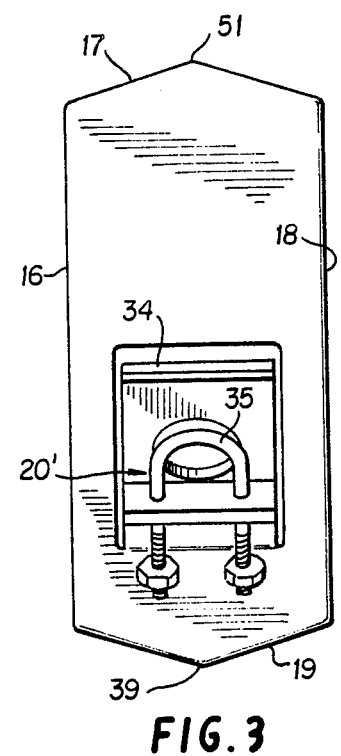
FIG. 3 is a fragamentary top view of the closed end of the hood assembly afforded by this invention showing an alternative mechanism for mounting onto a sprayer spray head.

The hood 15, as better seen from FIGS. 2 and 3, has clamping means 20 affixed to the hood closed end wall 21 for mounting the spray head to extend inside the hood to dispense spray 14 so that it hits the hood sidewalls, 16, 17, 18, 19. At least part of the herbicide is then dispensed in a desired dispensing pattern through the hood opening 22 by dripping downwardly off the sidewalls toward the ground 23 in a dispensing flow path 24.

Thus, as illustrated by the hatched border 28 alongside the sidewalk 29, this invention provides a trimming system for dispensing herbicides, so that mechanical cutting or trimming of unwanted edge grass is no longer necessary. In particular, this invention provide for an adjustably variable dispensing pattern that for example will vary the width of the dispensing path 30 along a straight or curved line produced by the manual manipulation of the person 9. Similarly, the trimmer may be used about a flower bed, shrub or tree to define a "no grass" area of desired width without the danger of killing the flowers, shrubs, etc. Such is true even when the wind is blowing, since the spray mist is modified to prevent the likelihood of being carried by wind gusts into the vicinity of desired plant life.

A preferred embodiment of the dispensing hood 15 provided by this invention is set forth in FIGS. 2 and 3. Thus, the closed end 21 and four sidewalls 6, 17, 18, 19 provide a hood with a generally rectangular opening end 33. With flexible plastic sidewall construction, such as used for gallon chemical or antifreeze containers, the hood is inexpensive and well adapted for the herinafter described novel opening adjustment features.

In the closed end portion 21 of such a hood 15, such as by means of a hinged flap portion 34 of the end wall directed inwardly at an appropriate angle, is mounted the spray head receiving clamp 20. In the FIG. 1 embodiment this is illustrated as a deformable molded plastic frictional spring clamp dimensioned to fit the sprayer wand or spray head inlet pipe near the spray head and hold it in a fixed position inside the hood to direct spray against the hood sidewalls in the manner aforesaid. In the FIG. 2 embodiment, a wider range of spray head configurations may be clamped in place by the variably adjustable U-bolt assembly 35 of modified clamp 20'.

As better seen from FIG. 1, the flexible sidewalls are deformable by bellows action as provided by the shaped end structure shown by creases 39. Thus, the larger area sidewalls 16, 18 may be flexed to variably adjust the width "w" therebetween, thereby providing means for variably dispensing herbicides along line paths of various width. To provide simple, low cost means for effecting variable width herbicide flow paths, the button fasteners 41-44 are provided in the sidewalls 16 and 18 near the mouth of the hood opening 33.

Figure 4:
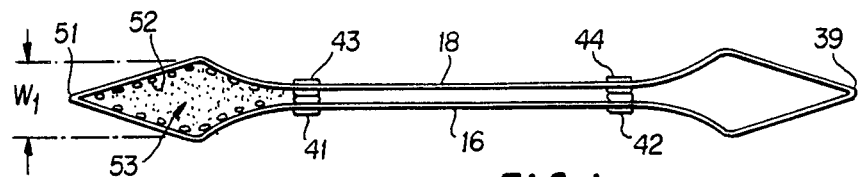
FIGS. 4 to 7 are various sketches of hood opening configurations and construction features for varying the opening shape to dispense trimming herbicide in different patterns along a dispensing path determined by manual movement.

In FIG. 4, the cross section shape of the outlet opening is diagrammatically sketched to show one width selection "$w_1$" of the dispensing flow path, as effected when both pairs of button fasteners 41-43 and 42-44 are engaged. With the spray head directed toward the crease 51 end wall of the hood, then the spray contacts the walls and drips downwardly as droplets 52. It is readily seen that this with the opening shape 53 will restrict the dispensing flow pattern to achieve the improved trimming functions afforded by this invention, including the adjustment of the path width and the prevention of damage in dispensing herbicides in the presence of wind gusts.

Figure 5:
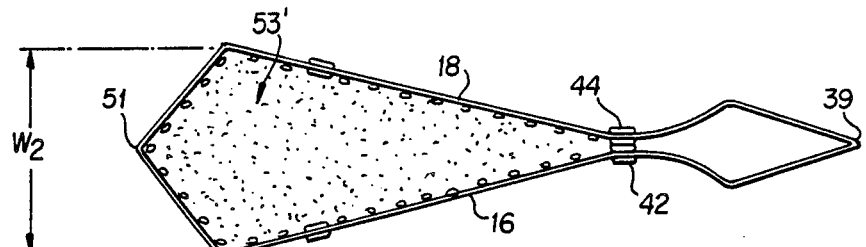
Figure 6:
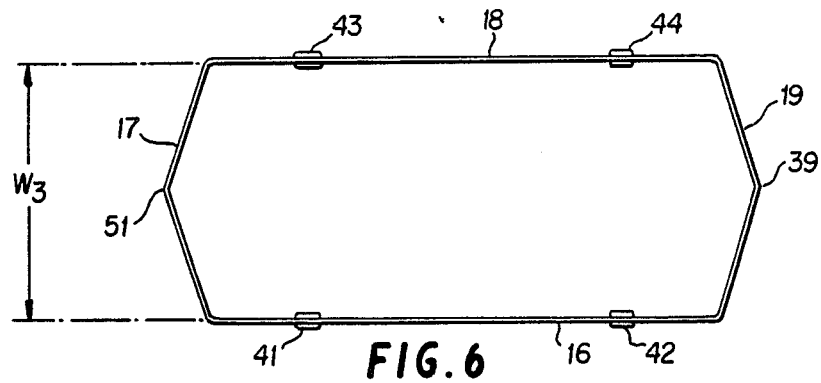

Another dispensing path width "$w_2$" is achieved by fastening only the button fasteners 42 and 44, as shown in FIG. 5, where the modified opening 53' is produced. Thus, the flexible plastic walls and bellows structure provides a built in spring action that tends to conform the opening structure into the natural position of FIG. 6, with the further width selection "$w_3$", when the button fasteners are all unfastened.

Figure 7:
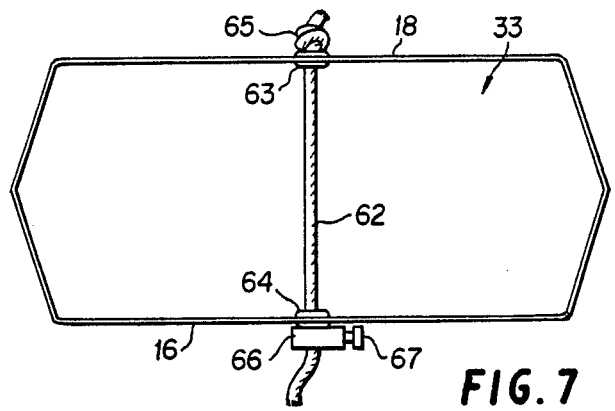

With the novel teachings of this invention, it is evident that variations may be made which do not depart from the spirit or scope of the invention. For example, as shown in FIG. 7, other means for varying the hood opening configuration to produce different flow path shapes may be employed. Thus, the flexible cord 62 is passed through grommeted sidewall apertures 63, 64 and is held in place by a knot 65 and slidable spring loaded clamp 66, Thus, by manual adjustment of the clamp 66 position along the cord 62 by means of push button 67 that counteracts the spring actuated clamp (not shown) the opening configuration is changed to provide selectable dispensing path widths.

Those novel features believed descriptive of the spirit and scope of the invention are now set forth with particularity in the following claims.

I claim:

1. A hood accessory for a hand bell sprayer to be held above the ground for dispensing herbicides toward the ground along a restricted path, comprising in combination, a hollow hood body member having flexible walls defining a substantially closed end and an open end opening of defined shape for dispensing said herbicides in a pattern related to the shape of the opening, attachment means in the hood member for mounting internally a spray head of said sprayer in a position for directing herbicides out said open end and toward the ground when hand held and against the hood walls from which they may run downwardly for dispensing on the ground with the hood positioned to prevent the herbicides from being carried by the wind away from said pattern, and selectably adjustable means for retaining the hood opening in a plurality of shapes for defining various width herbicide dispensing flow paths from the spray head through the opening, wherein said attachment means directs spray of herbicides out of said opening onto said ground in said pattern along said path and wherein said hood body member with four thin plastic walls is shaped to form a substantially rectangular opening with bellows type structure in two opposite walls to permit the opening to attain said shapes by positioning of the remaining two sidewalls and a set of fastener members along the opening on opposite walls for holding the walls together, thereby to comprise said adjustable means.

2. A hood accessory for a hand held sprayer to be held above the ground for dispensing herbicides toward the ground along a restricted path, comprising in combination, a hollow hood body member having flexible walls defining a substantially closed end and an open end opening of defined shape for dispensing said herbicides in a pattern related to the shaped of the opening, attachment means in the hood member for mounting internally a spray head of said sprayer in a position for directing herbicides out said open end and toward the ground when hand held and against the hood walls from which they may run downwardly for dispensing on the ground with the hood positioned to prevent the herbicides from being carried by the wind away from said pattern, and selectably adjustable means for retaining the hood opening in a plurality of shapes for defining various width herbicide dispensing flow paths from the spray head through the opening, wherein said attachment means directs spray of herbicides out of said opening onto said ground in said pattern along said path and wherein a flexible cord is disposed through two opposing ones of said walls and has means operable therewith for adjustment of said opposing walls at various distances from each other.

* * * * *